United States Patent
Friesen et al.

(10) Patent No.: US 12,463,805 B2
(45) Date of Patent: Nov. 4, 2025

(54) METHOD FOR GENERATING SECRETS WITH A VEHICLE, AND VEHICLE

(71) Applicant: MERCEDES-BENZ GROUP AG, Stuttgart (DE)

(72) Inventors: Viktor Friesen, Karlsruhe (DE); Micha Koller, Pliezhausen (DE); Hubert Rehborn, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 55 days.

(21) Appl. No.: 18/281,053

(22) PCT Filed: Jun. 2, 2022

(86) PCT No.: PCT/EP2022/065096
§ 371 (c)(1),
(2) Date: Sep. 8, 2023

(87) PCT Pub. No.: WO2023/274660
PCT Pub. Date: Jan. 5, 2023

(65) Prior Publication Data
US 2024/0154798 A1    May 9, 2024

(30) Foreign Application Priority Data
Jun. 29, 2021   (DE) ............ 10 2021 003 341.8

(51) Int. Cl.
*H04L 9/08*    (2006.01)

(52) U.S. Cl.
CPC .......... *H04L 9/0869* (2013.01); *H04L 9/0866* (2013.01); *H04L 9/0872* (2013.01);
(Continued)

(58) Field of Classification Search
CPC ....... H04L 9/08; H04L 9/0869; H04L 9/0866; H04L 9/0872; H04L 9/0891;
(Continued)

(56) References Cited

U.S. PATENT DOCUMENTS 8,526,606 B2 * 9/2013 Muthaiah ............ H04L 9/3231
380/270
9,794,059 B2 * 10/2017 Nguyen ............ H04W 12/106
(Continued)

FOREIGN PATENT DOCUMENTS

DE    102005061281 A1    6/2007
DE    102013201245 A1    7/2014
(Continued)

OTHER PUBLICATIONS

International Search Report and Written Opinion mailed Sep. 28, 2022 in related/corresponding International Application No. PCT/EP2022/065096.
(Continued)

*Primary Examiner* — Shaqueal D Wade-Wright
(74) *Attorney, Agent, or Firm* — PATENT PORTFOLIO BUILDERS PLLC

(57) ABSTRACT

A method for generating secrets using a vehicle involves a computing unit reading input data and processing the input data to generate at least one secret using rules. At least action data is used as the input data, the action data being generated by the vehicle after carrying out at least one action. The computing unit calculates a unique pseudo-random byte sequence from the action data using the rules. The pseudo-random byte sequence is used as the secret or pseudo-random byte sequence is further processed by a function in order to derive the secret.

19 Claims, 1 Drawing Sheet

(52) U.S. Cl.
CPC .......... *H04L 9/0891* (2013.01); *H04L 9/0894* (2013.01); *H04L 2209/84* (2013.01)

(58) Field of Classification Search
CPC . H04L 9/0894; H04L 2209/84; H04L 9/0643; H04L 9/0877; H04L 63/06; H04L 9/50
See application file for complete search history.

(56) References Cited

U.S. PATENT DOCUMENTS

| | | |
|---|---|---|
| 10,507,795 B1 | 12/2019 | Schubert |
| 2012/0155636 A1 | 6/2012 | Muthaiah |
| 2015/0066350 A1 | 3/2015 | Iwata |
| 2016/0295401 A1 | 10/2016 | Berge et al. |
| 2017/0134382 A1* | 5/2017 | Darnell .................. H04L 67/12 |
| 2018/0026949 A1* | 1/2018 | Kimn .................. H04W 12/069 |
| | | 713/156 |
| 2018/0205729 A1 | 7/2018 | Carlesimo |
| 2021/0281400 A1* | 9/2021 | Dai .................... H04L 63/0442 |

FOREIGN PATENT DOCUMENTS

| | | |
|---|---|---|
| DE | 102013201245 B4 | 8/2016 |
| DE | 102019121164 A1 | 2/2020 |
| JP | 2008228051 A | 9/2008 |
| JP | 2014107804 A | 6/2014 |
| JP | 2017108376 A | 6/2017 |
| JP | 2018100563 A | 6/2018 |

OTHER PUBLICATIONS

Office Action created Feb. 25, 2022 in related/corresponding DE Application No. 10 2021 003 341.8.
Office Action dated Sep. 3, 2024 in related/corresponding JP Application No. 2023-553446.

* cited by examiner

METHOD FOR GENERATING SECRETS WITH A VEHICLE, AND VEHICLE

BACKGROUND AND SUMMARY OF THE INVENTION

Exemplary embodiments of the invention relate to a method for generating secrets with a vehicle, and to a vehicle for carrying out the method.

Modern vehicles have a variety of interfaces for data transmission and communication. These interfaces can be used for communication between purely technical systems, such as between the vehicle and a cloud server, between several vehicles or the vehicle and infrastructure, between different control units within the vehicle, or also between control units installed in the vehicle and external third-party devices, such as a smartphone. Data can be transmitted in a variety of ways, for example via mobile radio, WIFI, Ethernet, CAN bus, USB, Bluetooth, NFC, or the like. Communication between a technical system and a human being, such as a person driving the vehicle, is also possible. To prevent any compromise of a communication taking place via such an interface, such interfaces are typically cryptographically secured. Communication via such an interface is accordingly protected, for example encrypted and/or authenticated, wherein a suitable cryptographic key, for example in the form of a byte sequence stored on a storage medium and/or in the form of a password, is required to decrypt the transmitted data or to generate an authentication stamp. Such a cryptographic key represents a secret, and therefore, for reasons of simplification, is referred to in the following as a secret.

To increase security against compromise, such a cryptographic key should ideally have sufficient entropy. This means, among other things, that the cryptographic key or the secret should be composed of a sufficiently long random or pseudorandom sequence of digits, numbers, or bytes. This makes it more difficult to determine secrets such as keys and passwords, for example by so-called brute force methods. If only interfaces between purely technical systems are secured, the processing of comparatively long or complicated cryptographic keys poses no problems. People, on the other hand, often have difficulty remembering long and complex passwords.

In order to make it easier for people to use complex cryptographic keys, a variety of methods exist. For example, password managers are known, which allow the management of a large number of different passwords. After entering a central, easy-to-remember password, a person using the password manager can access the passwords managed by the password manager. This means that the person no longer has to remember many different and complex passwords themselves.

Secrets, in this case a cryptographic key, can also be stored on a hardware system, for example a USB stick. Such a USB stick is also called a dongle. If a user has to authenticate themself to a technical system, they can connect the dongle to the technical system, whereupon the technical system reads the cryptographic key from the dongle. To increase security, however, it is usually necessary for the user to connect the dongle to the technical system and also, additionally, to enter a password. Thus, it is again necessary for the user to remember a password. In addition, the dongle could become lost or damaged and in this way become non-functional.

Thus, there is no way around users having to remember passwords that are as long and complex as possible, and thus secure. Especially when using different services, an individual password should be chosen for each service so that a potential attacker cannot gain access to all services if the attacker gets hold of the user's password.

Since remembering many different, long and complex passwords is often difficult for humans, there is a need for methods to easily and reproducibly generate different secrets with a high entropy.

DE 10 2013 201 245 B4 describes a method for carrying out a cryptographic operation with a position-dependent cryptographic key. Here, a smart card determines its current location with the help of a localization unit and uses this location together with data stored on the smart card to create a position-dependent cryptographic key using a so-called key derivation function. The position-dependent cryptographic key thus created is then used to perform a cryptographic operation. The cryptographic operation can be, for example, the generation or verification of a signature and the encryption or decryption of attributes. Since the current location of the smart card is used in the key derivation function to create the position-dependent cryptographic key, location-dependent cryptographic keys are generated using the method disclosed in the document. This makes it possible to perform particularly secure cryptographic operations, since misuse of the smart card at an unauthorized location does not allow the cryptographic operation to be performed due to a cryptographic key created differently as a result. The data stored on the smart card may include, for example, a vehicle identifier. Thus, the method disclosed in the document can be used in the context of vehicles for collection of toll fees.

A similar authentication technique is known from DE 10 2005 061 281 A1, which enables location-dependent authentication.

Exemplary embodiments of the present invention are directed to a method for generating secrets with a vehicle, with the aid of which a user can generate and reproduce a particularly secure secret particularly easily and reliably initially.

In a method for generating secrets with a vehicle of the type described at the outset, a computing unit reads in input data and processes the data further to generate at least one secret using rules. According to the invention, at least action data are used as input data, wherein the action data are generated by the vehicle after at least one action has been performed. The computing unit then calculates a unique pseudorandom byte sequence from the action data using the rules. The pseudorandom byte sequence may be used directly as a secret. Alternatively, the pseudorandom byte sequence can be further processed by a function to derive a corresponding secret from the pseudorandom byte sequence.

With the aid of the method according to the invention, secrets such as passwords and/or cryptographic keys can be generated particularly easily and reliably. The use of a computing unit to generate the secrets allows secrets to be generated that have a comparatively high entropy, in particular a comparatively long byte sequence or high password length, preferably using lowercase and uppercase letters as well as numbers and special characters.

If the same deterministic rules are used to generate the secret, the same secret can be reliably generated again given the same action data. This allows a person to generate a secret using the method according to the invention and, if the person has forgotten or deleted the secret in the meantime, to generate the secret again. To do this, the person only has to remember the execution of the actions performed with the vehicle. This is much more intuitive than remembering complex passwords or remembering where a person has stored a digital secret, for example in the form of a cryptographic key.

The secret generated with the aid of the method according to the invention can be used in a variety of ways. For example, a secret in the form of a password can be output via a display device of the vehicle. This allows a person carrying out the method to capture and remember the password. In this case, the password can be displayed as plain text, or also, for example, in the form of an optoelectronic code such as a QR code. For example, the person can photograph the QR code with a smartphone, whereupon the password is transmitted to the smartphone. The secret can also be stored on a storage medium. For this purpose, for example, a secret in the form of a cryptographic key can be transferred from a computing unit of the vehicle, for example by USB, Bluetooth, NFC, or the like, to a corresponding storage medium such as a USB stick, or a mobile terminal such as a smartphone, laptop, tablet computer, wearable, or the like. In this way, the user can easily transport the secret and continue to use it in another location, for example on a home computer.

The vehicle-generated secret can also be used to perform security functions directly in the vehicle. For example, the vehicle-generated secret can be used to log in to a service, or to authenticate an administrator to change in-depth settings in a vehicle sub-menu.

The method according to the invention can also be used to generate so-called recovery seeds. Such a recovery seed can be used, for example, to regenerate a private key of a bitcoin hardware wallet if the private key has been lost. This can be the case if the user has misplaced the hardware wallet or it has broken. To use a recovery seed created off-board the vehicle, this recovery seed can be used as an input variable for the method according to the invention. The recovery seed can be read in for various method steps. For example, the recovery seed can be linked to the action data and used to create the pseudorandom byte sequence, or a prompt for entering the recovery seed can be issued after the secret has been created so that the recovery seed directly forms the secret. A recovery seed can also be generated by the vehicle itself.

An advantageous development of the method provides that a key derivation function is used as the function. The key derivation function is also referred to by the acronym KDF. Such a key derivation function is a cryptographic hash function that permits the derivation of one or more secret keys from a secret value using a pseudorandom function. This allows an even more secure secret to be generated using the method according to the invention, as a secret is derived from the pseudorandom byte sequence. A potential attacker must therefore know the key derivation function used in order to also be able to reproduce the secret in the event that they have intercepted the pseudorandom byte sequence.

According to a further advantageous embodiment of the method, at least one action is performed for real with the vehicle or the execution of at least one action is simulated by the vehicle. An execution of the action for real leads to a user being able to remember the actions to be performed to generate the secret particularly well. However, performing the action with the vehicle might not be possible under certain conditions and/or might take a lot of time. In order to still be able to generate the secret in such a case, the actions that would otherwise have to be performed for real with the vehicle can also be simulated by the vehicle. In this case, it may be necessary that a certain action must first be performed for real and that the action can only be simulated when the secret is generated again. On the other hand, it may also be necessary that a certain action is simulated first and then execution for real takes place. To generate the secret, it may be necessary to perform one or more actions. All of the actions to be performed may be real or simulated. It is also possible for some of the actions to be performed for real and for some of the actions to be simulated.

Preferably, a user can specify for at least one action whether it is to be performed for real or virtually, whereupon the secret is only generated if the corresponding action has been performed according to the method specified by the user. This further increases the security of the generation of the secret. In particular, if an attacker does not know which action is real and which action is virtual, it is more difficult for the attacker to reproduce the secret.

To simulate an action, a user can enter corresponding steps describing the action into an input device of the vehicle. Using the steps describing the action, the computing unit is then able to simulate the action. For example, if a chain of actions used to create a secret consists of driving a full left-hand circle and then accelerating to 50 km/h, the user can select different vehicle actions from a list, such as driving a left turn, braking to a certain speed, driving at a constant speed for a distance of X meters, or the like. If they then select the correct action(s), the secret is created.

According to a further advantageous embodiment of the method, in addition to the action data, at least one of the following data types is used to calculate the pseudorandom byte sequence and/or to derive the secret from the pseudorandom byte sequence using the function:

state data of the vehicle and/or a vehicle sub-system; and/or vehicle-specific data.

By additionally taking into account the state data and/or the vehicle-specific data vehicle-specific data together with the action data, it can be made more difficult for an attacker to reproduce the secret, since the attacker, in order to generate the secret, must know and enter the state data, vehicle-specific data available when the secret was initially generated. In general, an empty list can also be used as action data. In other words, the secret can be generated solely from the state data and/or the vehicle-specific data. This eliminates the need to perform the actions. This may allow a user to generate a secret even more quickly and easily. Thus, a list of possible vehicle actions for the simulative creation of a secret may also include the vehicle action: "no action".

A further advantageous embodiment of the method further provides that the action data are generated by performing at least one of the following actions:

travelling a specified route with the vehicle;

visiting at least one specified location with the vehicle performing at least one specified driving maneuver with the vehicle; and/or inputting an operating action of a person into an operating device of the vehicle.

The execution of at least one of the listed actions allows the user to remember a process for generating the secret particularly intuitively. For example, the user only has to remember which route they have taken with the vehicle, which location they have visited, which driving maneuver they have performed and/or which input they have input into the operating device of the vehicle. To generate the secret it may be sufficient merely to perform one action. However, it may also It may be necessary for the user to perform several actions. In particular, the user can specify how many and which actions they want to perform in order to generate the secret. This increases a convenience for the user in carrying out the method according to the invention. In addition, the user can define a level of security for generating the secret. For example, if a user has only a limited ability to remember things, they can determine that comparatively few actions are necessary to generate a secret. If, on the other hand, the user has a good memory, they can specify that more actions are to be performed to generate the secret. As the number of actions to be performed increases, it also becomes more difficult for an attacker to reproduce the secret.

In particular, if a comparatively large number of actions requiring a comparatively long period of time have to be performed in order to generate a secret, for example the actual driving of a route running from Munich to Hamburg, a potential attack can possibly still be detected and prevented in good time.

The route is a connection between a starting point and a destination. This can be travelled with the vehicle for real or can be transmitted to the computing unit via the control unit for simulation. For this purpose, corresponding waypoints located on the route are to be transmitted to the computing unit. Such a waypoint or a place to be visited with the vehicle can be, for example, a petrol station, a car park, a point of interest, a place of residence of the user, or the like.

The driving maneuver may be a certain value of a longitudinal and/or transverse guidance of the vehicle as well as combinations thereof. For example, the maneuver may be a certain steering angle and a steering direction and/or a certain acceleration or speed. For example, the driving maneuver may be driving a left-hand circle, a figure of eight, a turning maneuver, or the like. The acceleration and speed can also be negative. This means that the vehicle is braking or reversing.

The operating actions input into the operating device may be, for example, the recovery seed of a bitcoin hardware wallet, that is to say the entry of a specific sequence of digits, letters and/or characters. It may also be any sequence of actuations of controls of the vehicle. Such a sequence consists, for example, of any actuation of a light switch of the vehicle, a windscreen wiper system of the vehicle, an infotainment system, for example, a volume controller or a station selector, a control element of an air conditioning device, such as a selector switch for setting a certain ventilation intensity and/or temperature, or the like. In addition to the position of a corresponding selector switch, for example a ventilation intensity controller that is moved from a ventilation intensity of zero to a maximum ventilation intensity, a speed with which the corresponding controller or switch is moved can also be detected. If, for example, an attacker turns the control too slowly or too quickly, the operating action is detected as incorrect.

According to a further advantageous embodiment of the method, at least one of the following state variables is used as state data:
  a current location of the vehicle;
  a relative position of the vehicle with respect to a static object in the environment;
  a point in time or a period of time;
  a radio station currently tuned on a vehicle radio;
  at least one identifier of a third party device registered to the vehicle;
  at least one identifier of a third party device currently connected to the vehicle;
  an identifier of an audio track output at a specified time via an audio output means of the vehicle;
  a setting of at least one vehicle seat;
  a gear selected in a gearbox;
  a degree of opening of at least one vehicle window;
  a charging status of at least one vehicle battery; and/or
  a current tank fill level of a fuel tank of the vehicle.

With the help of the listed state variables, a user is able to create a particularly large number of different situations for generating individual secrets.

In order to determine the location of the vehicle, the vehicle may have a device for determining a geo-position. The geo-position may be determined using a global navigation satellite system. This can determine the location of the vehicle using, for example, GPS. However, the location of the vehicle can also be determined in other ways. For example, it can also be determined by triangulation, with the position of several mobile phone masts, radio transmitting stations or the like being used as reference variables.

To determine the relative position of the vehicle with respect to the static object in the environment, the vehicle comprises corresponding environment detection sensors. These may be, for example, a camera. For example, the static object in the environment may be a house, a garage or a specific object located in the garage. Thus, the corresponding static object in the environment is detected by the camera and the object in the environment is recognized by image analysis of the camera images generated by the camera. If the specific static object in the environment then has a specific orientation in the camera image to be evaluated, the relative position of the vehicle to be maintained with respect to the static object in the environment is deemed to be fulfilled.

A point in time or a period of time can also be taken into account to generate the secret. The time can be, for example, a certain time of day, a day of the week, a certain month, or a season. Also, a specific time period, for example, a time period from 8 am to 12 noon or a time period from 13.04 to 20.05 can be used to generate the secret. Thus, the generation of a certain secret is only possible at certain times. The time can also be linked to the actions. This means, for example, that a user must enter certain sections of a driving maneuver or operating actions according to specified time intervals. For example, to create a certain secret, the user must accelerate for three seconds and then steer the vehicle to the right after two seconds. It may also be necessary for the user to hold down a certain control element of the vehicle for, for example, ten seconds.

The third-party device registered or connected to the vehicle can be, for example, a mobile terminal such as a smartphone, laptop, tablet computer, wearable, or the like. The connection between the vehicle and the third party device can be made, for example, via Bluetooth, NFC, WIFI, or in a wired manner, for example via a USB cable or an Ethernet cable. Here connected means that the third-party device currently has a communication connection to the vehicle. Registered means that the third-party device has been in communication with the vehicle at least once, and thus the identifier of the third-party device is stored in the vehicle. The identifier can be, for example, a MAC address, an IP address, a Bluetooth identifier or the like.

The vehicle's audio output means of the vehicle may be, for example, an infotainment system with associated speakers. The audio track may be, for example, a specific song. For example, a particular secret can only be initially generated or reproduced when a user plays a particular song via the infotainment system. It may be sufficient that the song is merely played to generate the secret, or a specific passage of the song must be played. For example, a passage between 1:10 min and 1:20 min. It may also be necessary for the user to pause the song output via the infotainment system at a certain point.

The vehicle can be designed as a hybrid vehicle or a fully battery-electric vehicle. Accordingly, it has at least one tank and/or a vehicle battery such as a traction battery. To generate a certain secret, it may also be necessary that at least one vehicle battery, such as the traction battery or a starting battery, has a certain charge status and/or the tank is filled to a certain level. The tank may also be, for example, a storage container such as a urea container, a coolant container, or a storage container for a windscreen wiper system.

A further advantageous embodiment of the method further provides that at least one of the following variables is used as vehicle-specific data:
 a vehicle identification number;
 a serial number of a computing unit of the vehicle;
 a registration number of the vehicle;
 a vehicle-specific number;
 a radio code of a vehicle radio;
 a cryptographic key of a vehicle locking system; and/or
 a secret generated by a computing unit.

With the help of vehicle-specific data, a certain secret can only be reproduced with the same vehicle. This enables a particularly secure method for generating secrets, since in order to generate or reproduce a specific secret, an attacker must carry out the method according to the invention with the same vehicle as the user. With the help of the vehicle-specific data, it is thus possible to uniquely identify a specific vehicle.

The computing unit can be, for example, the computing unit that calculates the pseudorandom byte sequence from the action data using the rules or another hardware security module. For example, the hardware security module may generate and store a vehicle-specific cryptographic key that is unique to the vehicle. If the hardware security module is defective, however, the secret or a reproduction of the secret is irretrievably lost. A secret generated by the method according to the invention can also be used as an input variable for generating another secret. The method can thus be repeated as often as desired to generate particularly secure secrets. For example, a secret can be generated in the form of a cryptographic key; this can be stored on a dongle and the generation of a further secret may only be possible if the dongle is connected to the vehicle again.

For example, the vehicle locking system cryptographic key may be a radio key transmitted from a radio vehicle key. Thus, it is necessary for a vehicle key of the vehicle to be provided in communication proximity with the vehicle for the generation of a specific secret.

According to a further advantageous embodiment of the method, at least two different vehicles use the same rules and/or functions to generate a secret. This makes it possible to reconstruct the same secret with different vehicles from the same action data, state data and/or vehicle-specific data. If the user changes the vehicle, for example because they exchange an old leased vehicle for a new leased vehicle, the user can also reconstruct their secret with the new vehicle. Providing the rules in the vehicle, or the function, can be done in different ways. For example, a vehicle may comprise a specific rule set and the user may select a rule to be applied from the existing rule set. Also, rules and/or functions may be transmitted from a vehicle manufacturer to the vehicle, for example over-the-air. The rules and/or functions can also be transmitted during a maintenance interval of the vehicle, in particular also by cable.

A further advantageous embodiment of the method further provides that action data and state data of the same type acquired at successive times may differ by a type-dependent difference value in order to be perceived as an individual value. Such a difference value can be used to improve the reproducibility of an action to be performed to generate the action data and/or of the state data. If, for example, the action to be performed consists of driving around a left-hand bend, the question arises as to how far a person driving the vehicle has to turn their steering wheel, i.e., which steering angle is selected in order to distinguish between left-hand bends with different radii. For this purpose, a valid steering angle range is defined according to a type-dependent difference value, which allows the generation of a certain secret. The steering angle range can be chosen to be as large as desired. For example, it may consist merely of the steering wheel being steered to the left with any steering angle, or it may be that a specific steering angle of, for example, 25 to 35 degrees or 30 to 32 degrees or the like must be turned. This applies analogously to the state data. For example, a particular radio station may be considered tuned if an original frequency of the radio station is exceeded by no more than 1 MHz. This can ensure that the particular radio station can be reliably tuned in when the reception strength changes. The type-dependent difference value can thus be used to compensate for inaccuracies when carrying out the method according to the invention, which improves the reproducibility of the secret.

In order to check whether a certain action has been performed correctly, a value of the corresponding action data and/or state data detected by the vehicle can be output. Based on the output value, the user can quickly and easily check whether they have correctly performed the action required to generate the secret. For example, it may also be necessary for the user to first confirm the detected action data and/or state data before it is processed further. In this way, the user can be sure that the vehicle registers the performed action as the user actually wishes it to be.

Preferably, a recovery hint is output to guide a person to generate a secret. Generally, a user may forget at least some of the actions to be performed to generate a particular secret, the state data used in this process, and/or a method by which an action is to be performed, i.e., a real or simulated execution. When creating the secret, the user can specify that a recovery hint can be output as required, with the help of which the user can remember the forgotten actions or states, if necessary. This provides a security mechanism with the help of which secrets can be reconstructed particularly reliably.

In a vehicle with at least one computing unit, according to the invention, the computing unit is set up to carry out a method described above. The vehicle may be any vehicle, such as a car, lorry, van, bus or the like. The computing unit may be any computing unit of the vehicle, such as a central on-board computer, a telematics unit, a control unit of a vehicle sub-system, or the like. The computing unit is able to record actions performed with the vehicle or to simulate them in order to generate action data or to receive such data through another computing unit and to calculate a unique pseudorandom byte sequence from the action data and/or state data as well as vehicle-specific data by applying defined rules. This sequence can be used directly as a secret or processed further to derive the secret from the pseudo-random byte sequence using a function such as a key derivation function. Accordingly, the computing unit comprises at least one storage medium and a processor for storing a program code suitable for carrying out the method according to the invention and for running it. Similarly, the vehicle comprises input means and output means for inputting operating actions and outputting secrets.

Further advantageous embodiments of the method according to the invention can be found in the exemplary embodiments, which are described in greater detail below with reference to the figures.

BRIEF DESCRIPTION OF THE DRAWING FIGURES

DETAILED DESCRIPTION

Figure 1:
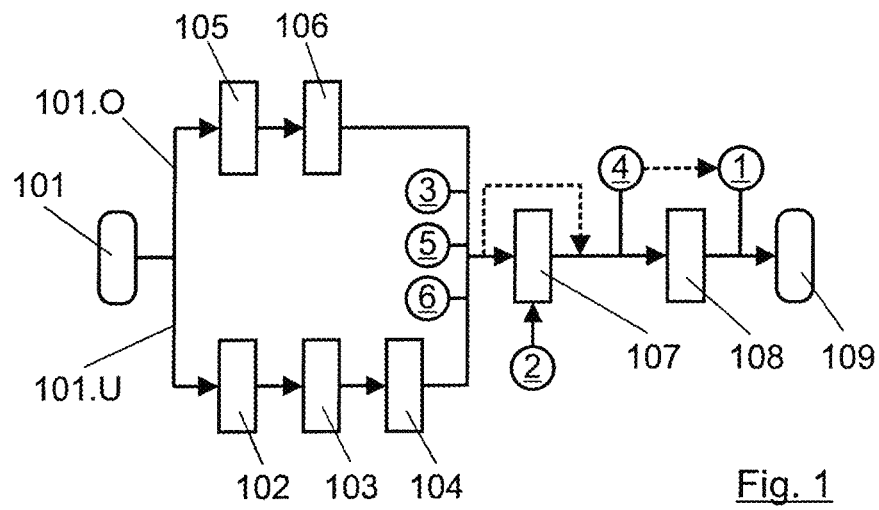
FIG. 1 shows a flow chart of a method according to the invention.

FIG. 1 shows a flow chart of a method according to the invention. In a method step 101, a user decides to generate a secret 1 with a vehicle. According to the path 101.U running downwards in FIG. 1, actions to be performed are actually performed, and according to the path 101.O running upwards, the actions to be performed are simulated.

The actual execution of the actions provides for a method step 102, in which the user specifies how many and which actions are to be performed and whether and which state variables and/or vehicle-specific variables are to be used to generate a secret 1. In a subsequent method step 103, the user performs the actions to be performed. In a subsequent method step 104, relevant data in the form of action data 3, state data 5, and/or vehicle-specific data 6 are detected after the action(s) has (have) been performed.

If the actions are simulated, a method step 105 is performed. In the method step 105, the user selects the actions to be performed as well as any state variables and vehicle-specific variables. In the method step 106, the user then enters the corresponding information to perform the simulation, for example waypoints of a route to be travelled with a vehicle.

This also generates action data 3. The action data 3 and, if required, state data 5 and/or vehicle-specific data 6 are read in a method step 107 by a computing unit, which, using rules 2, calculates a unique pseudorandom byte sequence 4 from the action data 3, state data 5, and/or vehicle-specific data 6. The pseudorandom byte sequence 4 can already be used as secret 1, which is shown by a dashed arrow.

However, it is also possible to derive the secret 1 from the pseudorandom byte sequence 4 according to a method step 108. For this purpose, the pseudorandom byte sequence 4 is further processed by a function, for example a key derivation function. In addition to the pseudorandom byte sequence 4, the action data 3, state data 5, and/or vehicle-specific data 6 can also be used by the function or the key derivation function in method step 108 to derive the secret 1, which is symbolized by a dashed arrow leading past method step 107. The linking of the pseudorandom byte sequence 4 with the action data 3, state data 5, and/or vehicle-specific data 6 takes place, for example, according to a concatenation. Depending on different secrets 1, different combinations of action data 3, state data Sand/or vehicle-specific data 6 can be selected to generate a specific secret 1. Thus, the action data 3, state data 5 and/or vehicle-specific data 6 can also be understood as secret-specific data.

After the secret 1 has been generated, the method ends in method step 109.

Figure 2:
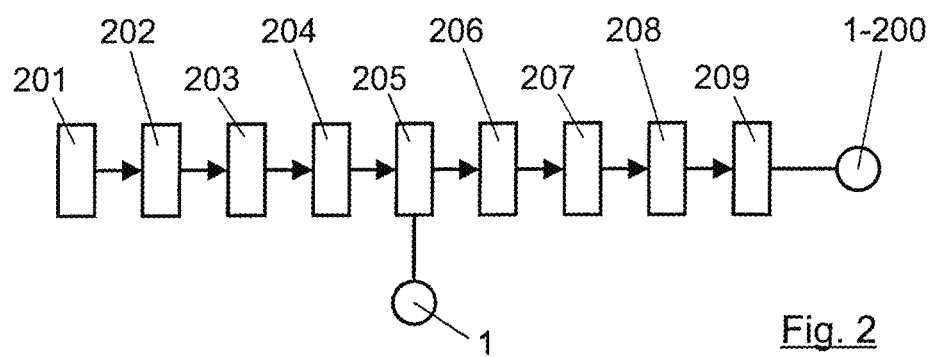
FIG. 2 shows a flow chart of an exemplary initial generation of a secret with the method according to the invention.
Figure 3:
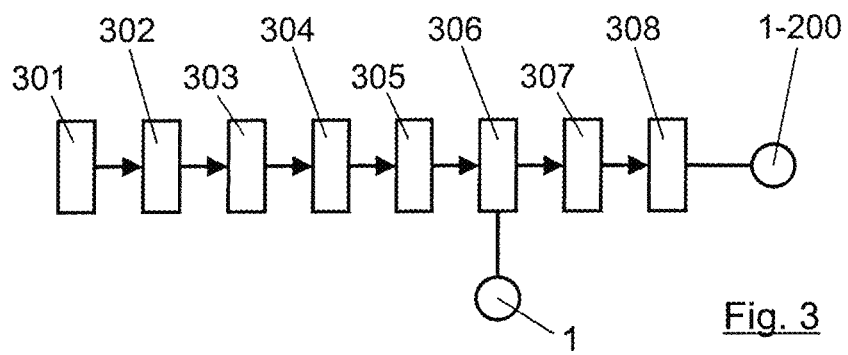
FIG. 3 shows a flow chart of an exemplary reproduction of the secret generated in FIG. 2.

The following exemplary embodiment serves to illustrate how the method according to the invention can be used to generate and store a recovery seed of a bitcoin hardware wallet and to recover this recovery seed. FIG. 2 shows the initial generation of a recovery seed generated by the vehicle for recovering the recovery seed of the hardware wallet, and FIG. 3 shows the retrieval of the recovery seed for recovering the recovery seed of the hardware wallet.

In a method step 201, a user informs the vehicle via an input device that they would like to generate a secret 1 with the vehicle by inputting a route.

In method step 202, the user informs the vehicle that they want to use the generated secret 1 to encrypt a recovery seed of a hardware wallet. In other words, the secret 1 itself forms a recovery seed for recovering the recovery seed of the hardware wallet. In order to avoid confusion, the recovery seed of the hardware wallet will be referred to hereinafter as the recovery seed and the recovery seed to be created with the vehicle to recover the recovery seed of the hardware wallet will be referred to as the secret 1. In general, it would also be conceivable for the recovery seed of the hardware wallet to form the secret 1 directly.

In a method step 203, via the input device, the user enters the route to be travelled by the vehicle, which is then to be used to generate the secret 1. The user selects a route here that they can remember particularly well but that is difficult for third parties to guess.

In a method step 204, the user indicates that, in order to generate the secret 1, the action to be performed, i.e., travelling the route, must actually take place.

In a method step 205, the user drives the route with the vehicle, whereupon the vehicle, or the computing unit comprised by the vehicle, generates a 256-bit secret 1. Only action data 3 were used here to generate the secret 1. The use of state data 5 and vehicle-specific data 6 was spared. However, this is generally also possible.

In a method step 206, the user enters the recovery seed generated by the hardware wallet via the input device. The recovery seed can be read digitally or entered manually into the input device.

In method step 207, the recovery seed is concatenated with an indicator that execution of the action for real is required to reproduce the secret 1. Subsequently, the concatenation of the recovery seed with the indicator is encrypted with the 256-bit secret 1. In general, it is conceivable that the second element of the concatenation, in this case the requirement that the action must be performed in reality, is also encrypted or remains unencrypted.

In method step 208, the user selects how to output the thus encrypted concatenation 1-200 of the recovery seed with the indicator. For example, the encrypted concatenation 1-200 can be stored on a USB stick or sent by e-mail to a destination e-mail address.

In method step 209, the vehicle performs the selected output action.

To recover, i.e., to view or create a digital copy of the recovery seed, the user must transmit the encrypted concatenation 1-200 issued in method step 209 to a vehicle with which the user wishes to recover the recovery seed. This may be done, for example, by connecting a USB flash drive containing the encrypted concatenation 1-200 to the vehicle. In general, if, to recover the recovery seed, the user uses the same vehicle that the user also used to generate the encrypted concatenation 1-200, the encrypted concatenation 1-200 may also be stored in a memory unit of a computing unit of the vehicle after creation. To view or create a digital copy of the recovery seed, the user then only needs to drive the corresponding route. Since the user has dispensed with the use of vehicle-specific data 6, they can use any vehicle for this purpose. This minimizes the risk of a total loss of the recovery seed and thus of the bitcoins stored in the hardware wallet.

The method to be carried out to recover the recovery seed is illustrated in FIG. 3. In method step 301, the user informs the vehicle via an input device that they want to create a secret 1 with the vehicle by inputting a route.

In method step 302, the user informs the vehicle that they wish to use the now generated secret 1 to decrypt an encrypted concatenation 1-200.

In method step 303, the user connects to the vehicle the USB stick with the encrypted concatenation 1-200 stored on it, which was output in step 209. If the user uses the same vehicle with which the user also performed method step 209, there is no need to read in the stored encrypted concatenation 1-200, as the encrypted concatenation 1-200 may also have been stored in the vehicle itself.

In the case of a non-co-encrypted indicator, in method step 304 the vehicle checks the second element of the encrypted concatenation 1-200 generated in method step 209 and outputs information that the action(s) to be performed to decrypt the encrypted concatenation 1-200 must be performed for real. The method step 304 may be optional, which reduces the risk of compromise. Thus, an attacker must know in advance whether they actually have to perform the actions required for decryption or whether a simulation of the actions is also sufficient.

In method step 305, the user drives the vehicle along the route.

In method step 306, the vehicle acquires the action data 3 generated by travelling the route and generates the pseudorandom byte sequence 4 therefrom. Lastly, the secret 1 for decrypting the encrypted concatenation 1-200 is derived from the pseudorandom byte sequence 4.

In method step 307 the vehicle uses the secret 1 to decrypt the first element of the encrypted concatenation 1-200 stored on the USB stick or in the computing unit of the vehicle. Now it is checked whether the two second elements of the two tuples, i.e., the secrets 1 generated in steps 205 and 306, match, i.e., whether the correct action was performed with the vehicle.

If this is the case, the first element of the now decrypted, previously encrypted concatenation 1-200, i.e., the recovery seed, is offered to the user for output in method step 308. If this is not the case, the output or direct use of the encrypted concatenation 1-200 is prevented and the user is informed that the route travelled was incorrect.

In general, it is also possible that the first tuple element of the encrypted concatenation 1-200, i.e., the recovery seed, is only decrypted when the two second tuple elements of the secrets 1 generated in method steps 205 and 306 match, i.e., the correct action has been performed with the vehicle. This can reduce further. still the risk of data compromise. Accordingly, the tuples of a secret 1 are encrypted and decrypted separately.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for generating secrets with a vehicle, the method comprising:
receiving, by a processor of the vehicle, a user selection of at least one action to be used to generate at least one secret;
reading, by the processor of the vehicle, input data, wherein the input data includes action data generated by the vehicle after the at least one action is performed, wherein the at least one action includes performing at least one specified maneuver with the vehicle or inputting a person's control action into a control device of the vehicle;
determining, by the processor of the vehicle, that the action data of the input data indicates that the at least one action was performed; and
generating, by the processor based on rules and responsive to the determination that the at least one action was performed, the at least one secret using the input data by
calculating a unique pseudorandom byte sequence from the action data using the rules; and
using the unique pseudorandom byte sequence as the at least one secret or further processing the unique pseudorandom byte sequence by a function to derive the at least one secret.

2. The method of claim 1, wherein the function used to derive the at least one secret is a key derivation function.

3. The method of claim 1, wherein the at least one action is performed for real with the vehicle or execution of the at least one action is simulated by the vehicle.

4. The method of claim 3, further comprising:
receiving, from a user specifies for the at least one action, whether the at least one action is to be performed for real or virtually, wherein the at least one secret is only generated if the corresponding action is performed according to the whether the user specified that the at least one action is to be performed real or virtually.

5. The method of claim 1, wherein one of the following data types is used in addition to the action data to calculate the unique pseudorandom byte sequence or to derive the at least one secret from the unique pseudorandom byte sequence using the function:
state data of the vehicle or state data of a sub-system of the vehicle;
vehicle-specific data; or
position data.

6. The method of claim 5, wherein the position data is generated by performing at least one of the following actions:
travelling a specified route with the vehicle; and
visiting at least one specified location with the vehicle.

7. The method of claim 5, wherein at least one of the following state variables is used as the state data:
a current location of the vehicle;
a relative position of the vehicle with respect to a static object in an environment of the vehicle;
a point in time or a period of time;
a radio station currently tuned on a radio of the vehicle;
at least one identifier of a third party device registered to the vehicle;
at least one identifier of a third party device currently connected to the vehicle;
an identifier of an audio track output at a specified time via an audio output of the vehicle;
a setting of at least one seat of the vehicle;
a gear selected in a gearbox of the vehicle;
a degree of opening of at least one window of the vehicle;
a charging status of at least one battery of the vehicle; and
a current tank fill level of a fuel tank of the vehicle.

8. The method of claim 5, wherein at least one of the following variables is used as the vehicle-specific data:
a vehicle identification number of the vehicle;
a serial number of a computing unit of the vehicle;
a registration number of the vehicle;
a vehicle-specific number;
a radio code of a radio of the vehicle;
a cryptographic key of a locking system of the vehicle; and
a secret generated by the computing unit of the vehicle.

9. The method of claim 1, wherein the rules or the function to derive the at least one secret is used by at least two different vehicles.

10. The method of claim 5, wherein the action data, the state data, the position data of a same type acquired at successive times may differ by a type-dependent difference value in order to be identified as an individual value.

11. The method of claim 1, further comprising:
outputting a recovery hint to guide a person to generate the at least one secret.

12. The method of claim 1, further comprising:
storing the at least one secret on an external storage medium; or
electronically transmitting the at least one secret to a destination.

13. The method of claim 1, further comprising:
determining, by the processor of the vehicle based on action data generated during a subsequent use of the vehicle, that the at least one action has been performed, and performing at least one of
storing the at least one secret on an external storage medium; and
electronically transmitting the at least one secret to a destination.

14. A vehicle, comprising:
a processor; and
a memory coupled to the processor,
wherein the processor is configured to
receive a user selection of at least one action to be used to generate at least one secret;
read input data, wherein the input data includes action data generated by the vehicle after at least one action is performed, wherein the at least one action includes performing at least one specified maneuver with the vehicle or inputting a person's control action into a control device of the vehicle;
determine that the action data of the input data indicates that the at least one action was performed; and
generate, based on rules and responsive to the determination that the at least one action was performed, the at least one secret using the input data by
calculating a unique pseudorandom byte sequence from the action data using the rules; and
using the unique pseudorandom byte sequence as the at least one secret or further processing the unique pseudorandom byte sequence by a function to derive the at least one secret.

15. The vehicle of claim 14, wherein the processor is further configured to:
store the at least one secret on an external storage medium; or
electronically transmit the at least one secret to a destination.

16. The vehicle of claim 14, wherein the processor is further configured to:
determine, based on action data generated during a subsequent use of the vehicle, that the at least one action has been performed, and perform at least one of
store the at least one secret on an external storage medium; and
electronically transmit the at least one secret to a destination.

17. A method, comprising:
receiving, by a vehicle processor of a vehicle, a user input specifying how many and which action(s) are to be performed to generate at least one secret, wherein the action(s) include performing at least one specified maneuver with the vehicle or inputting a person's control action into a control device of the vehicle;
reading, by the vehicle processor subsequent to receiving the user input, input data collected by the vehicle;
determining, by the vehicle processor based the input data, that the action(s) specified by the user input is/are performed; and
generating, by the vehicle processor based on rules and responsive to the determination the action(s) specified by the user was/were performed, at least one secret using the input data by
calculating, using rules, a unique pseudorandom byte sequence from action data associated with the performance of the action(s) in the input data; and
using the unique pseudorandom byte sequence as the at least one secret or further processing the unique pseudorandom byte sequence by a function to derive the at least one secret.

18. The method of claim 17, further comprising:
storing the at least one secret on an external storage medium; or
electronically transmitting the at least one secret to a destination.

19. The method of claim 17, further comprising:
determining, by the vehicle processor based on input data collected by the vehicle during a subsequent use of the vehicle, that the action(s) has/have been performed, and performing at least one of
storing the at least one secret on an external storage medium; and
electronically transmitting the at least one secret to a destination.

* * * * *